Patented Oct. 14, 1930

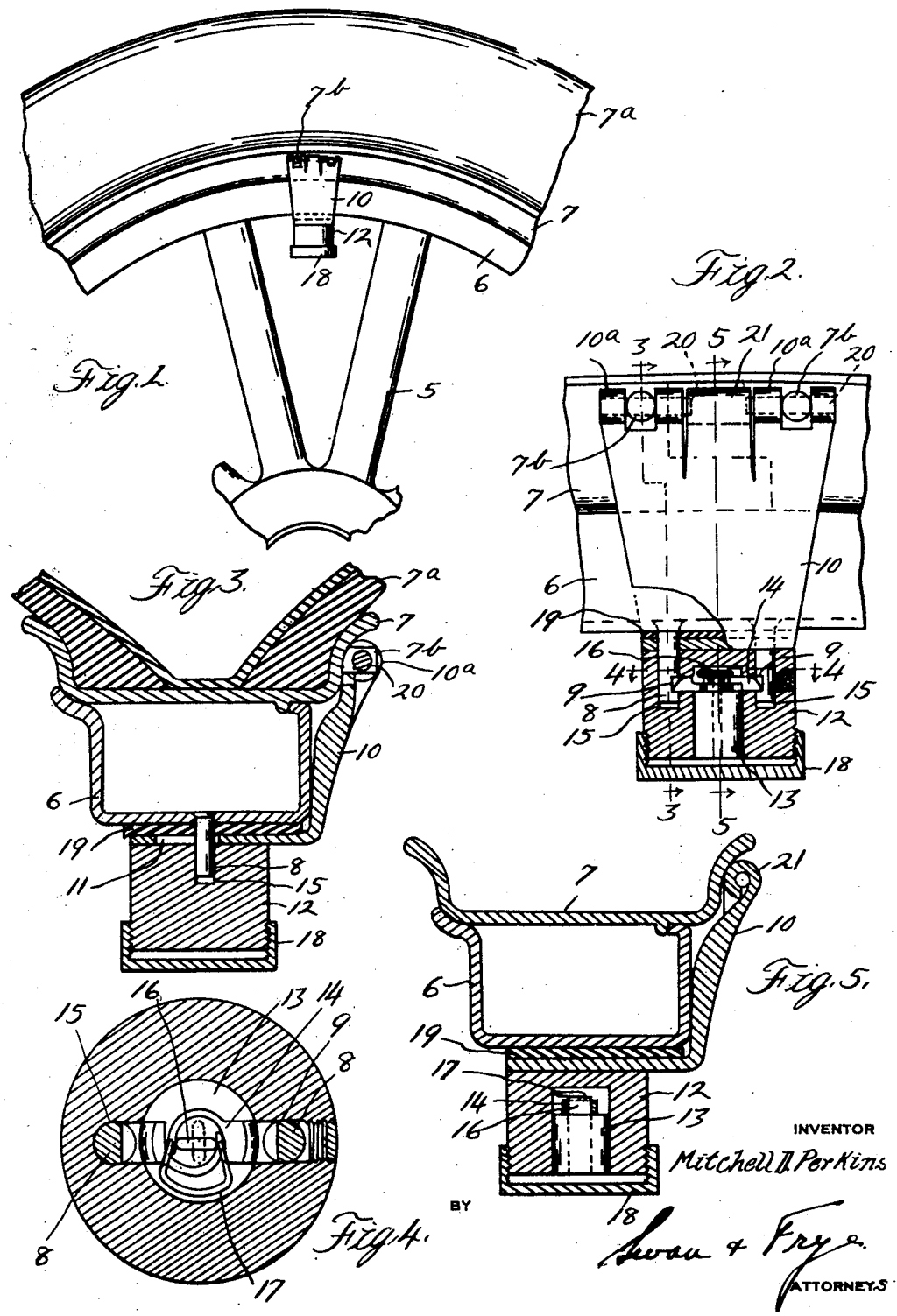

1,778,466

UNITED STATES PATENT OFFICE

MITCHELL D. PERKINS, OF DETROIT, MICHIGAN

LOCKING DEVICE FOR TIRE RIMS

Application filed March 11, 1929. Serial No. 346,125.

This invention relates to locking devices for the tires and rims ordinarily employed on automobiles and like vehicles, and has for its principal object the provision of a simple, compact, and effective locking device that may readily be employed upon tire rims when in use as well as upon spare tires and rims.

A further object of this invention is the arrangement of notched locking studs upon the wheel proper (or a support for a spare tire), a slotted hasp-like member pivoted upon the tire rim in position to swing over the studs when desired, and cooperating locking means including a key-operated lock upon a detachable cap member adapted to fit over the studs and enter the notches thereof to prevent the removal of the hasp member from the studs until the key-operated lock is turned to free the cap member from the studs and the cap member removed.

Other objects and advantages will be apparent from the following description, wherein reference is made to the accompanying drawing illustrating a preferred embodiment of my invention and wherein similar reference numerals designate similar parts throughout the several views.

In the drawings:

Figure 1 is a side elevation of a portion of a wheel and tire rim equipped with my improved locking device.

Figure 2 is an enlarged elevational view of the locking device with parts shown in section.

Figure 3 is a vertical section taken substantially on the line 3—3 of Figure 2.

Figure 4 is an enlarged horizontal section taken substantially on the line 4—4 of Figure 2, and Figure 5 is a vertical section taken substantially on the line 5—5 of Figure 2.

Referring now to the drawings, the numeral 5 designates a wheel of an automobile, or like vehicle, having a felloe 6 supporting a tire rim 7. The rim 7 and felloe 6 may be of any desired construction and the illustrated embodiment portrays a conventional type of tire rim and felloe by way of example. The felloe 6 may be secured upon wheels of various types, such as the usual artillery type wheels, disc wheels, wire wheels, etc., and for the purposes of this invention, the wheel 5 may be considered as rigidly supported upon a spare rack carried by the vehicle body as well as mounted in the usual manner for rotation.

Extending inwardly from the inner periphery of the felloe 6 are a plurality of locking studs 8 preferably notched, as at 9, for the reception of latching elements, as hereinafter described. Pivotally mounted upon the tire rim 7 is a hasp-like member 10 provided adjacent its free extremity with elongated slots 11 and shaped so that when it is swung into cooperating relation with the studs 8, the hasp-like member 10 will substantially conform to the shape of the felloe 6 (note Figure 3). When the rim 7 is properly mounted upon the felloe 6, the hasp member 10 may be swung so that its slotted portion will readily pass over the studs 8, and it may be retained in such position by means of a detachable cap member 12 carrying a key-operated lock 13 and latching members 14 controlled thereby for entering the notches 9 of the studs 8. As long as the cap member 12 is retained in its locked position upon the studs 8, the hasp member 10 cannot be withdrawn from its cooperating relation with the studs, and so the rim 7 and its tire 7ª cannot be removed by malicious or mischievous persons.

The cap member 12 is herein shown as having a pair of apertures 15 extending from one of its ends for the reception of the studs 8 and extending from the other extremity of the cap member and between the openings 15 is an opening wherein the barrel of the lock 13 may be secured. Various types of locks and locking elements controlled thereby may be employed in carrying out my invention, but I prefer a standard tumbler lock adapted, when a proper key is arranged therein, to rotate a lock bolt operating member 16. As best illustrated in Figure 4, the member 16 may be arranged as an elongated cam adapted when in one position (shown in full lines in Figure 4) to draw the lock bolts 14 inwardly out of engagement with the notches 9 of the studs 8, and when rotated to its other position (shown in dotted lines in Figure 4) to form a stop for the outward movement of the locking bolts 14, which are pressed outwardly into engagement with the notches 9 of the studs 8 by means of a spring 17. The spring 17 normally forces the locking elements 14 outwardly except as prevented from so doing by the cam 16, and to facilitate the ready locking of the cap member 12 upon the studs 8, I preferably incline the outer faces of the locking elements 14, so that they will be pressed inwardly against the tension of the spring 17 upon contact with the free ends of the studs 8 during the positioning of the cap member 12, and then snap into notches 9 of the studs when the cap member has been moved inwardly to the desired extent. When the locking members 14 have entered the notches 9 of the studs they can only be removed therefrom by turning the cam control member 16 after the proper key has been inserted into the lock 13 and the lock barrel rotated through the medium of the key. To prevent the entrance of mud, dust, etc., into the key-hole of the lock 13, I preferably cover the inner extremity of the lock 13 with a removable cap 18.

To prevent rattling of the locking device during the operation of the vehicle, I preferably provide a resilient cushion 19 between the felloe 6 and the hasp member 10, which cushion is of sufficient thickness that the hasp member 10 is snugly pressed against the cushion by the cap member 12 when the cap member is moved inwardly sufficiently to enable the entrance of the locking bolts 14 in the notches 9 of the studs. In other words, the free extremity of the hasp member 10 is firmly pressed by the cap member 12 into engagement with the cushion 19 of rubber or other suitable material and held in such position by the snapping of the locking bolts 14 into notches of the studs. The cushion member 19 is firmly pressed against the inner periphery of the felloe 6 at the same time, and accordingly, the movable elements, such as the hasp 10 and cap member 12 are prevented from vibrating during the operation of the vehicle.

The opposite end of the hasp memebr 10 may be suitably mounted to prevent vibration, and in the illustrated embodiment, I have shown a plurality of spaced apertured lugs 7ᵇ welded or other wise suitably secured upon the rim 7 and straddled by spaced apertured hinge portions 10ᵃ of the hasp, pintles 20 extending through the aligned apertures of the lugs 7ᵇ, and hinge elements 10ᵃ, when the hasp member is being assembled. Between the hinge elements 10ᵃ a portion of the hasp member 10 is arranged so that it will act as a resilient tongue 21 pressing against the inner extremities of the pintles 20 and serving both to prevent accidental loosening of the pintles and chattering of the hinge elements 10ᵃ relatively to the locks 7ᵃ.

The simplicity and practicability of my improved locking device is believed to be apparent, and it may be readily secured upon tire rims, felloes, and supports of vehicles now in general use as well as upon new vehicles.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

Having described my invention, what I claim is:

1. In a device of the character described, a relatively fixed member having a plurality of spaced locking studs thereon, a relatively demountable member adapted to be mounted on the fixed member and carrying a slotted hasp member in position to be moved over the studs, and a removable locking member adapted to enclose and be secured upon the studs to prevent removal of the hasp member from the studs.

2. In a device of the character described, a relatively fixed member having a plurality of spaced locking studs thereon, a relatively demountable member adapted to be mounted on the fixed member and carrying a slotted hasp member in position to be moved over the studs, and a removable locking member adapted to enclose and be secured upon the studs, and when in locked position, engaging the hasp member to prevent its removal from the studs.

3. In a device of the character described, a relatively fixed member having a plurality of spaced locking studs thereon, a relatively demountable member adapted to be mounted on the fixed member and carrying a slotted hasp member in position to be moved over the studs, and a removable locking member adapted to enclose and be secured upon the studs, and when in locked position, engaging the hasp member to prevent its removal from the studs, and a cushioning member arranged adjacent the studs to prevent rattling of the aforesaid members while in locked position.

4. In a device of the character described, a relatively fixed member having a plurality of spaced locking studs thereon, a relatively demountable member adapted to be mounted on the fixed member and carrying a slotted hasp member in position to be moved over the studs, and a removable locking member adapted to enclose and be secured upon the studs, and when in locked position, engaging the hasp member to prevent its removal from the studs, and a cushioning member arranged between the fixed member and the hasp member when mounted over the studs, and adapted to press the hasp member into firm engagement with said lock member.

In testimony whereof I sign this specification.

MITCHELL D. PERKINS.